US008582997B2

(12) United States Patent
Nakatsuji et al.

(10) Patent No.: US 8,582,997 B2
(45) Date of Patent: Nov. 12, 2013

(54) IMAGE FORMING APPARATUS

(75) Inventors: Hiroomi Nakatsuji, Osaka (JP); Jun Nakano, Osaka (JP)

(73) Assignee: Kyocera Document Solutions Inc. (JP)

( * ) Notice: Subject to any disclaimer, the term of this patent is extended or adjusted under 35 U.S.C. 154(b) by 190 days.

(21) Appl. No.: 13/190,568

(22) Filed: Jul. 26, 2011

(65) Prior Publication Data

US 2012/0051768 A1 Mar. 1, 2012

(30) Foreign Application Priority Data

Aug. 27, 2010 (JP) ................................ 2010-190588

(51) Int. Cl.
*G03G 15/00* (2006.01)
*H04N 1/405* (2006.01)

(52) U.S. Cl.
USPC .......................................... 399/72; 358/3.06

(58) Field of Classification Search
USPC ............ 399/11, 31, 49, 60, 72, 74, 180, 181; 347/131, 254; 358/1.2, 1.9, 3.03, 3.06, 358/3.09, 3.1, 3.13, 3.3, 521, 534, 504
See application file for complete search history.

(56) References Cited

U.S. PATENT DOCUMENTS 6,603,566 B1 8/2003 Shono
2006/0290989 A1* 12/2006 Kobayashi .................. 358/3.03

FOREIGN PATENT DOCUMENTS

JP 2000-101836 4/2000
JP 2000278543 A * 10/2000
JP 2007-322745 12/2007
JP 2007322745 A * 12/2007
JP 2010-164766 7/2010

OTHER PUBLICATIONS

Machine Translation JP 2000-278543.*
Machine Translation JP 2007-322745.*

* cited by examiner

*Primary Examiner* — Clayton E LaBalle
*Assistant Examiner* — Victor Verbitsky
(74) *Attorney, Agent, or Firm* — Stephen Chin

(57) ABSTRACT

In an image forming apparatus, a controller performs development of toner patterns corresponding to a first halftoning method and a second halftoning method. One of the toner patterns contains first patch images for the first halftoning method, and another one contains second patch images for the second halftoning method. The controller performs development of only one out of both a first patch image (one of the first patch images) and a second patch image (one of the second patch images) if an absolute value of a difference between the number of dots in the first patch image and that in the second patch image is equal to or less than a predetermined value and an absolute value of a difference between the number of dot-level edges in the first patch image and that in the second patch image is equal to or less than a predetermined value.

15 Claims, 6 Drawing Sheets

IMAGE FORMING APPARATUS

CROSS-REFERENCE TO RELATED APPLICATION

This application relates to and claims a priority right from a Japanese Patent Application No. 2010-190588, filed on Aug. 27, 2010, the entire disclosures of which are hereby incorporated by reference herein.

BACKGROUND OF THE INVENTION

1. Field of the Invention

This invention relates to image forming apparatuses.

2. Description of the Related Art

In an image forming apparatus that forms an image by electronic photography process, such as printer, copier, facsimile, and multi-function peripheral thereof, for instance, a toner image is developed on a photoconductor drum, and the toner image is transferred onto an intermediate transfer belt, and then transferred from the intermediate transfer belt to a sheet of print paper, and finally the toner image is fixed on the sheet of print paper.

In such image forming apparatus, when necessary or periodically, toner density and its gradation are adjusted. In a four-color image forming apparatus, toner density and its gradation are adjusted for each of four colors.

To print a scanned document, by using a threshold conversion process (e.g. an error diffusion process or a screen process) chosen according to the type of the document, some image forming apparatuses generate data of an image to be printed. Otherwise, for a single page, a plurality of threshold conversion processes may be used. Therefore, gradation adjustment must be performed for the error diffusion process and the screen process separately.

In the case that the apparatus performs automatic gradation adjustment of the error diffusion process, for instance, the apparatus has a ROM (Read Only Memory) that stores data of a pattern image generated by a single-threshold conversion from plain patch images corresponding to grades in a gradation, and forms a toner pattern image based on the data, detects the pattern image by a sensor, and then performs gradation adjustment based on the detection by the sensor. Alternatively, the apparatus performs the error diffusion process for each of pixels sequentially to generate data of a pattern image of single-threshold conversion, and stores the generated data in a RAM (Random Access Memory); and then forms a toner pattern image based on the data, detects the pattern image by a sensor, and then performs gradation adjustment based on the detection by the sensor.

SUMMARY OF THE INVENTION

In gradation adjustment, since a pattern image for the error diffusion process and a pattern image for the screen process are developed in serial, a distance from the top of the precedent pattern image to the end of the following pattern image is long. As a result, it takes a long time to determine toner density values of the pattern images by a sensor in the gradation adjustment.

Is proposed a method to adjust a gradation characteristic of one of an error diffusion process and a screen process according to a gradation characteristic of the other of them. However, there is a large difference between the error diffusion process and the screen process in halftoning calculation, and the gradation characteristics of them do not vary in the same manner due to its usage environment and its usage situation, and consequently, such adjustment may not be accurate.

This invention has been made in view of the aforementioned circumstances. It is an object to the present invention to provide an image forming apparatus that performs gradation adjustment in short time.

The present invention solves this subject as follows.

An image forming apparatus according to an aspect of the present invention has: an image carrier that holds a toner pattern; an memory device in which toner pattern data has been stored; a sensor that puts detection light onto the image carrier and detects reflection light from the image carrier; and a controller that performs development of toner patterns based on the toner pattern data corresponding to a first halftoning method and a second halftoning method, and identifies respective toner density values of patch images contained in each of the toner patterns from output of the sensor. The patch images are corresponding to grades in a gradation respectively. One of the toner patterns contains first patch images for the first halftoning method, and another of the toner patterns contains second patch images for the second halftoning. The controller performs development of only one out of both a first patch image which is one of the first patch images and a second patch image which is one of the second patch images and identifies toner density values of both the first patch image and the second patch image from output of the sensor for the only one out of both the first patch image and the second patch image if an absolute value of a difference between the number of dots in the first patch image and the number of dots in the second patch image is equal to or less than a predetermined value and an absolute value of a difference between the number of dot-level edges in the first patch image and the number of dot-level edges in the second patch image is equal to or less than a predetermined value.

Therefore, measurement time of toner density values is reduced because the full length of the toner patterns for gradation adjustment decreases. Accordingly, the time taken for gradation adjustment is reduced.

Further, an image forming apparatus according to another aspect of the present invention has: an image carrier that holds a toner pattern; a memory device in which toner pattern data has been stored; a sensor that puts detection light onto the image carrier and detects reflection light from the image carrier; and a controller that performs development of toner patterns based on the toner pattern data corresponding to a first halftoning method and a second halftoning method, and identifies respective toner density values of patch images contained in each of the toner patterns from output of the sensor. The patch images are corresponding to grades in a gradation respectively. One of the toner patterns contains first patch images for the first halftoning method, and another of the toner patterns contains second patch images for the second halftoning. A first patch image which is one of the first patch images corresponds to a grade equal to or higher than a predetermined grade, and a second patch image which is one of the second patch images corresponds to a grade equal to or higher than a predetermined grade. The controller performs development of only one out of both the first patch image and the second patch image and identifies toner density values of both the first patch image and the second patch image from output of the sensor for the only one out of both the first patch image and the second patch image if an absolute value of a difference between the number of dots in the first patch image and the number of dots in the second patch image is equal to or less than a predetermined value and an absolute value of a difference between the number of dot-level edges in the first patch image and the number of dot-level edges in the second patch image is equal to or less than a predetermined value.

Therefore, measurement time of toner density values is reduced because the full length of the toner patterns for gradation adjustment decreases. Accordingly, the time taken for gradation adjustment is reduced.

These and other objects, features and advantages of the present invention will become more apparent upon reading of the following detailed description along with the accompanied drawings.

DETAILED DESCRIPTION OF THE PREFERRED EMBODIMENT

Hereinafter, embodiments according to aspects of the present invention will be explained with reference to drawings.

Embodiment 1

Figure 1:
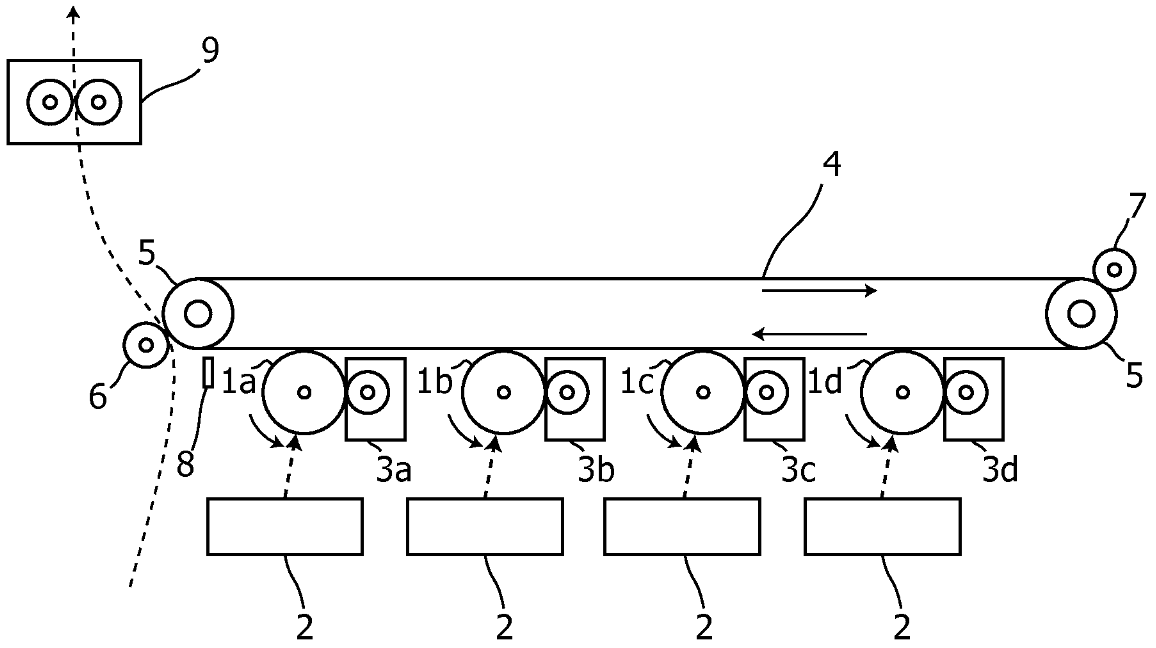
FIG. 1 is a side view that partially shows a mechanical internal configuration of the image forming apparatus in Embodiment 1 according to this invention.

FIG. 1 is a side view that partially shows a mechanical internal configuration of an image forming apparatus in Embodiment 1 according to this invention. The image forming apparatus is an apparatus having a printing function such as printer, facsimile apparatus, copier, or multi-function peripheral.

The image forming apparatus in Embodiment 1 has a tandem-type color development device. This color development device has photoconductor drums 1*a* to 1*d*, an exposure device 2, and development units 3*a* to 3*d*. The photoconductor drums 1*a* to 1*d* are four color photoconductors of Cyan, Magenta, Yellow and Black. The exposure device 2 is a device that forms electrostatic latent images by irradiating laser light to the photoconductor drums 1*a* to 1*d*. The exposure device 2 has laser diodes as light sources of the laser light, optical elements (such as lens, mirror and polygon mirror) that guide the laser light to the photoconductor drums 1*a* to 1*d*.

Further, in the periphery of the photoconductor drums 1*a* to 1*d*, charging units such as scorotron, cleaning devices, static electricity eliminators and so on are disposed. The cleaning devices remove residual toner on the photoconductor drums 1*a* to 1*d* after primary transfer. The static electricity eliminators eliminate static electricity of the photoconductor drums 1*a* to 1*d* after primary transfer.

The development units 3*a* to 3*d* are filled with four color toner of Cyan, Magenta, Yellow and Black, and make the toner adhere to electrostatic latent images on the photoconductor drums 1*a* to 1*d*, so that toner images are formed. A developer is composed of the toner and a carrier with external additives such as titanium dioxide.

The photoconductor drum 1*a* and the development unit 3*a* perform development of Magenta. The photoconductor drum 1*b* and the development unit 3*b* perform development of Cyan. The photoconductor drum 1*c* and the development unit 3*c* perform development of Yellow. The photoconductor drum 1*d* and the development unit 3*d* performs development of Black.

The intermediate transfer belt 4 is an image carrier and loop-shaped intermediate transfer member, and contacts the photoconductor drums 1*a* to 1*d*. Toner images on the photoconductor drums 1*a* to 1*d* are primarily transferred onto the intermediate transfer belt 4. The intermediate transfer belt 4 is hitched round driving rollers 5, and rotates by driving force of the driving rollers 5 towards the direction from the contact position with the photoconductor drum 1*a* to the contact position with the photoconductor drum 1*d*.

A transfer roller 6 makes a sheet of paper being conveyed contact the intermediate transfer belt 4, and secondarily transfers the toner images on the intermediate transfer belt 4 to the sheet. The sheet on which the toner images have been transferred is conveyed to a fixer 9, and consequently, the toner image is fixed on the sheet.

A roller 7 has a cleaning brush, and removes residual toner on the intermediate transfer belt 4 by contacting the cleaning brush to the intermediate transfer belt 4 after transferring the toner images to the sheet.

A sensor 8 irradiates light (detection light) to the intermediate transfer belt 4 and detects its reflection light. Intensity of the reflection light varies according to toner density and/or glossiness of a surface of the intermediate transfer belt 4. During toner density adjustment and gradation adjustment, the sensor 8 irradiates light to a predetermined area on the intermediate transfer belt 4, detects its reflection light, and outputs an electrical signal corresponding to the detected intensity of the reflection light. This electrical signal is input to a print engine 11 directly or via an amplifier circuit, and is sampled.

Figure 2:
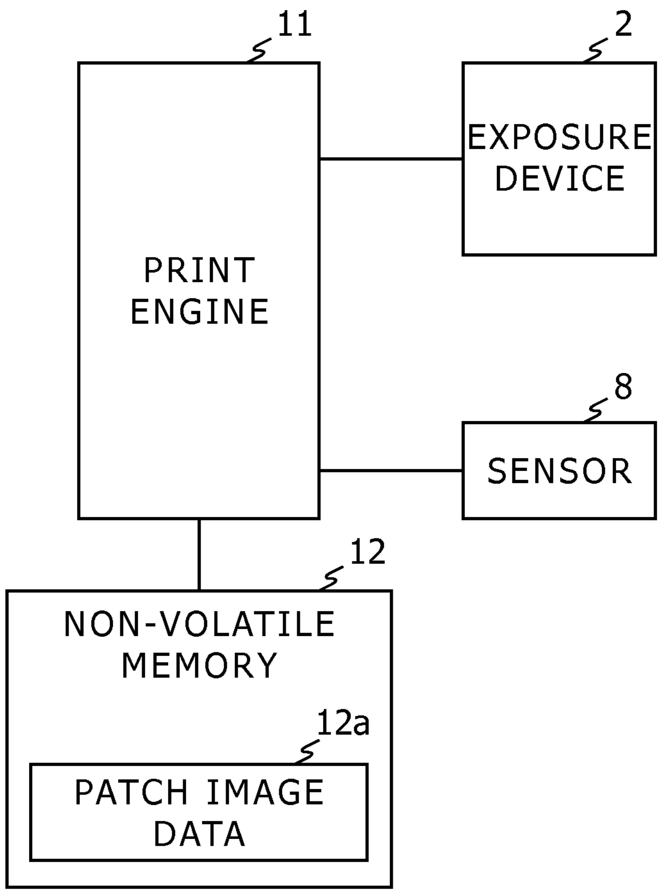
FIG. 2 is a block diagram that shows an electronic configuration of the image forming apparatus in Embodiment 1 according to this invention.

FIG. 2 is a block diagram that shows an electronic configuration of the image forming apparatus in Embodiment 1 according to this invention. In FIG. 2, the print engine 11 is a processing circuit that controls a driving source that drives the aforementioned rollers, a bias induction circuit that induces development biases and primary transfer biases, and the exposure device 2 in order to perform developing, transferring and fixing the toner image, feeding a sheet of paper, printing on the sheet, and outputting the sheet. The development biases are induced between the photoconductor drum 1*a* to 1*d* and the development units 3*a* to 3*d*, respectively. The primary transfer biases are induced between the photoconductor drum 1*a* to 1*d* and the intermediate transfer belt 4, respectively. The print engine 11 reads a gradation correction table, and corrects toner density of each grade in a gradation according to the table, and performs development of a toner image with the corrected toner density.

A non-volatile memory 12 is a memory device in which patch data 12*a* has been stored in Embodiment 1. As the non-volatile memory 12, a ROM, a flush memory or the like is used.

The patch image data 12*a* is used to generate a toner pattern during gradation adjustment. In gradation adjustment, the print engine 11 develops the toner pattern based on the patch data 12*a*, and generates a gradation correction table according to toner density values measured corresponding to patch images in the toner pattern that corresponds to grades in a gradation.

The patch image data 12*a* contains both (a) threshold-converted data of patch images that has been generated by halftoning of a screen method for predetermined grades in a gradation and (b) threshold-converted data of patch images that has been generated by halftoning of an error diffusion method for predetermined grades in a gradation.

However, at least one patch image in the patch images for the screen method is also used for the error diffusion method. Therefore, in the patch image data 12*a*, the patch images for the error diffusion method does not include a patch image of a grade of which the patch image for the screen method is also used for the error diffusion method.

In this embodiment, while at least one patch image of a grade in a gradation is shared for the screen method and the error diffusion method, at least one patch image for the error diffusion method is omitted corresponding to the shared patch image(s). Alternatively, the patch image data 12*a* may include the patch image(s) for the error diffusion method and not include the patch image(s) for the screen method.

In this embodiment, regarding any of patch images (a first patch image) in a toner pattern for the screen method, and any of patch images (a second patch image) in a toner pattern for the error diffusion method, the patch image data 12*a* includes data of one out of the first patch image and the second patch image and does not include data of the other, if an absolute value of a difference between the number of dots in the first patch image and the number of dots in the second patch image is equal to or less than a predetermined value and an absolute value of a difference between the number of dot-level edges in the first patch image and the number of dot-level edges in the second patch image is equal to or less than a predetermined value. For instance, when the differences of the number of dots and the number of dot-level edges are equal to zero respectively or when the difference of the number of dots is equal to zero and the difference of the number of dot-level edges is equal to or less than a predetermined value, the patch image data 12*a* includes data of one of the first patch image and the second path image and does not include data of the other. Hereafter, this rule is referred to as Rule 1.

Further, in this embodiment, regarding any of patch images (a first patch image) of a grade equal to or higher than a predetermined grade in a gradation for the screen method and any of patch images (a second patch image) of a grade equal to or higher than a predetermined grade in a gradation for the error diffusion method, the patch image data 12*a* includes data of one out of the first patch image and the second patch image and does not include data of the other, if an absolute value of a difference between the number of dots in the first patch image and the number of dots in the second patch image is equal to or less than a predetermined value. For instance, when the difference of the number of dots is equal to zero, the patch image data 12*a* includes data of one of the first patch image and the second patch image and does not include data of the other. Hereafter, this rule is referred to as Rule 2.

For example, Rule 2 is applied to only a patch image of the highest grade in a gradation. Alternatively, Rule 2 may be applied to patch images of the highest grade and the second highest grade.

Here, the dot-level edge is explained. In this embodiment, dot-level edges are counted in the primary scan direction. Along the primary scan direction, a place where a change occurs from a pixel without a dot to a pixel with a dot is counted as a dot-level edge, and a place where a change occurs from a pixel with a dot to a pixel without a dot is also counted as a dot-level edge. In this embodiment, dot-level edges are counted in the primary scan direction, but dot-level edges may be counted in the secondary scan direction. Alternatively, dot-level edges may be counted in both the primary scan direction and the secondary scan direction.

Figure 3:
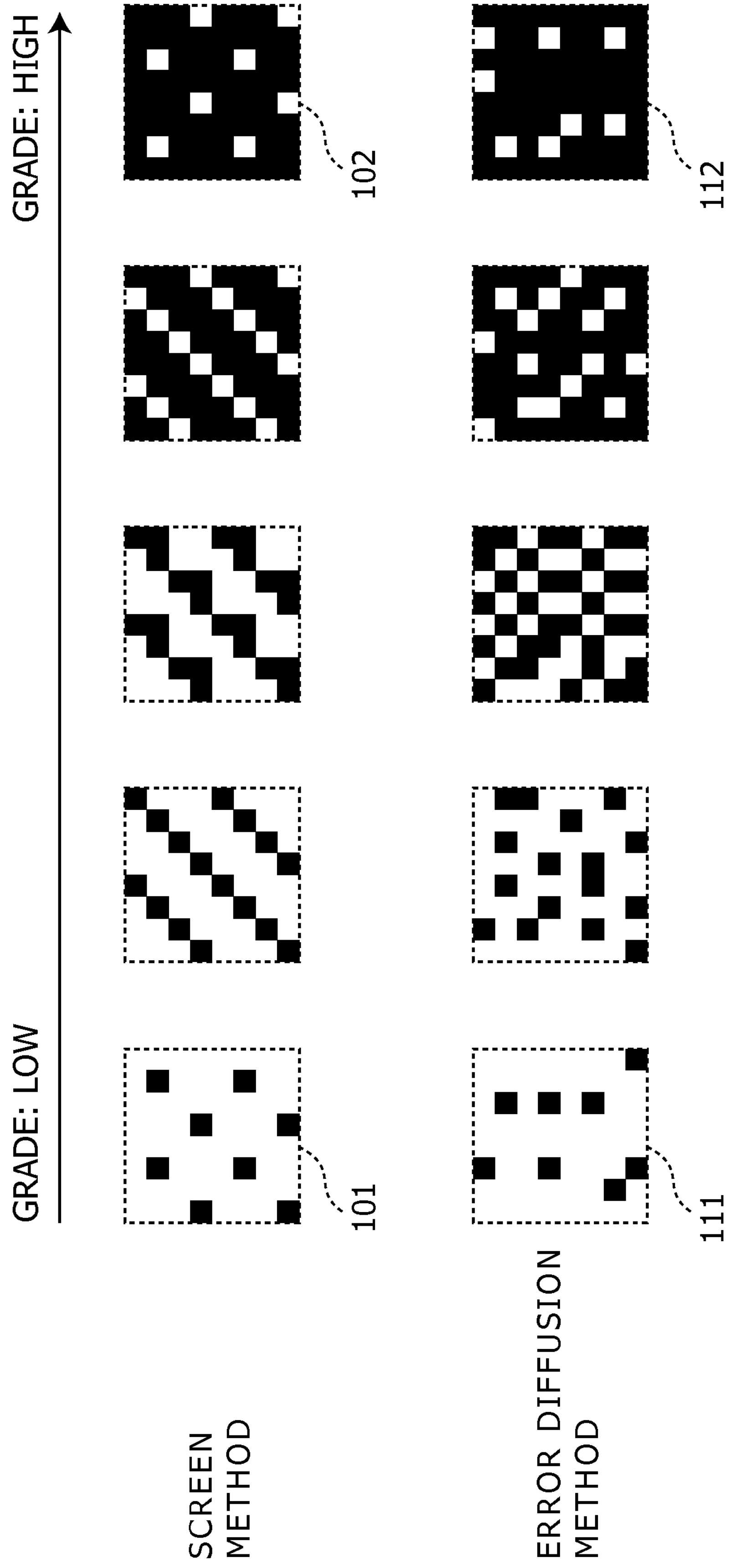
FIG. 3 is a diagram that shows an instance of patch images by using a screen method and an error diffusion method.

FIG. 3 is a diagram that shows an instance of patch images by using the screen method and the error diffusion method. FIG. 3 shows five patch images by the screen method and five patch images by the error diffusion method. As shown in FIG. 3, in low grades and high grades, dot patterns in the patch images obtained by the screen method and the error diffusion method are similar to each other. Accordingly, at least one of the patch images is shared as mentioned above.

In the case shown in FIG. 3, a patch image 111 of a low grade for the error diffusion method is omitted because the number of dots and the number of edges in the patch image 111 are the same as the ones in patch image 101 of the low grade for the screen method respectively. Furthermore, a patch image 112 of the grade equal to or higher than a predetermined grade for the error diffusion method is omitted because the number of dots in the patch image 112 is the same as the one in a patch image 102 of the same grade for the screen method.

In addition, in the case that toner patterns for a plurality of colors by a plurality of halftoning methods are developed in series, if a patch image of the lowest grade is omitted in one of the toner patterns, the toner pattern is developed so as to follow the previous toner pattern immediately (namely, without a blank with the size of the omitted patch image).

Further, in this case, if a patch image of the highest grade is omitted in one of the toner patterns, the next toner pattern is developed so as to immediately follow the toner pattern in which the patch image is omitted (namely, without a blank with the size of the omitted patch image).

Furthermore, in this case, if a patch image of an intermediated grade is omitted in a toner pattern, the patch image next to the omitted patch image is developed so as to immediately follow the patch image previous to the omitted patch image (namely, without a blank with the size of the omitted patch image).

Hereinafter is explained gradation adjustment that the aforementioned image forming apparatus performs.

Figure 4:
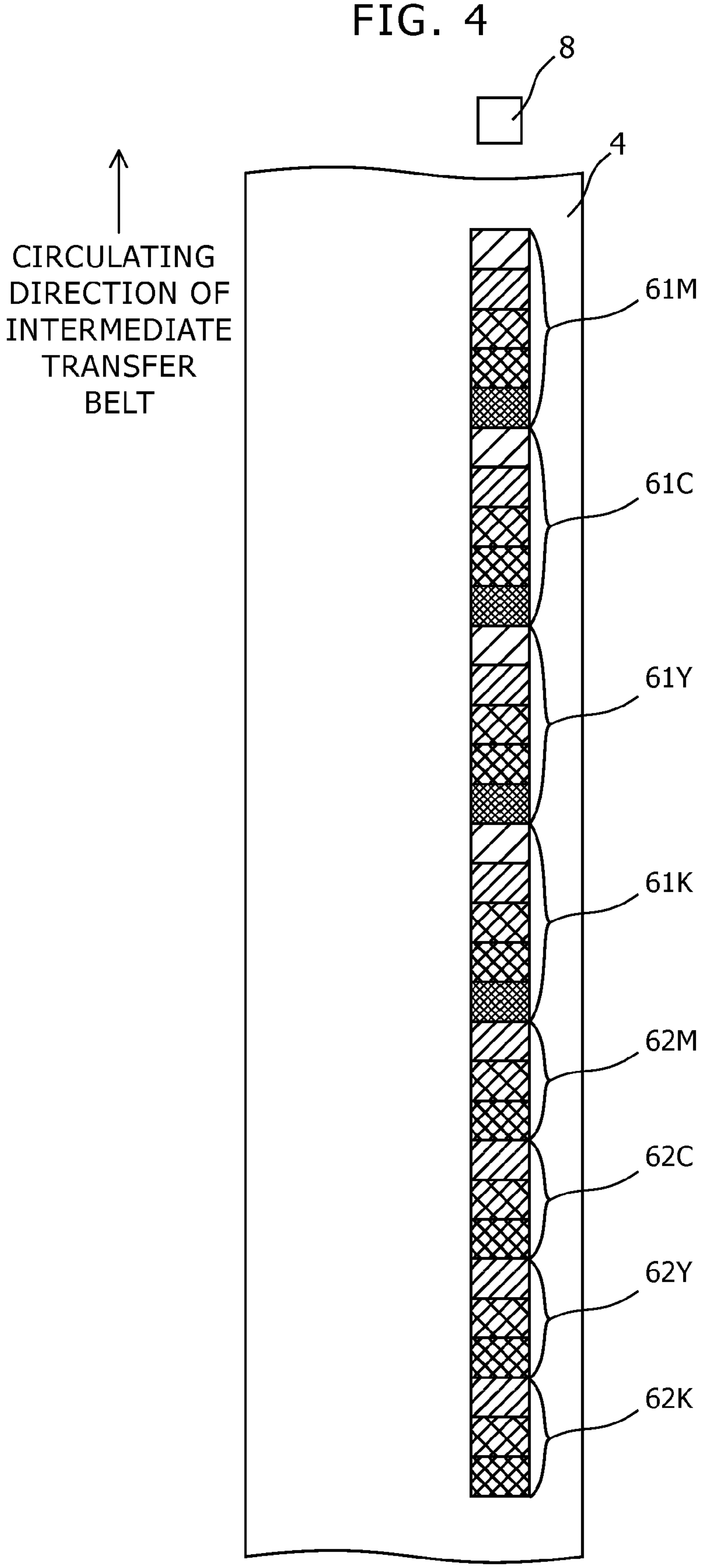
FIG. 4 is a diagram that shows an instance of patch images on an intermediate transfer belt in Embodiment 1 according to this invention.

FIG. 4 is a diagram that shows an instance of a toner pattern (patch images) on the intermediate transfer belt 4 in Embodiment 1.

Firstly, the print engine 11 starts rotation of the driving roller 5, the photoconductor drums 1*a* to 1*d*, and so on, and in the first lap of the intermediate transfer belt 4, from the sensor 8, obtains a detection value (i.e. a detection value of reflection light intensity) of a position on which patch images mentioned below are transferred in a surface of the belt 4.

Secondly, in the second lap, the print engine 11 reads out the patch image data 12*a*, and forms toner patterns 61M, 61C, 61Y, 61K, 62M, 62C, 62Y and 62K for gradation adjustment of respective colors on measurement positions that in the surface of the belt 4 according to the patch image data 12*a*, and obtains detection values on the toner patterns 61M, 61C, 61Y, 61K, 62M, 62C, 62Y and 62K from the sensor 8. The toner patterns 61M, 61C, 61Y, 61K, 62M, 62C, 62Y and 62K are instances of the patch images.

The toner patterns 61M, 61C, 61Y and 61K are toner patterns of Magenta, Cyan, Yellow and Black for gradation adjustment by the screen method (screen dither method), and the toner patterns 62M, 62C, 62Y and 62K are toner patterns of Magenta, Cyan, Yellow and Black for gradation adjustment by the error diffusion method.

The toner patterns 61M, 61C, 61Y and 61K have plural patch images corresponding to plural grades in a gradation respectively, and the toner patterns 62M, 62C, 62Y and 62K have plural patch images corresponding to plural grades in a gradation, respectively. However, as shown in FIG. 4, patch images of the lowest and the highest grades in the toner patterns 62M, 62C, 62Y and 62K are not developed because patch images of the lowest and the highest grades in the toner patterns 61M, 61C, 61Y and 61K are shared as the patch images of the lowest and the highest grades in the toner patterns 62M, 62C, 62Y and 62K.

The print engine 11 calculates respective toner density values of the patch images from the detection values of both the patch images and the belt surface in the same positions, and updates respective gradation correction tables of the error diffusion method and the screen method according to the result of the calculation. In FIG. 4, toner density values of the lowest and the highest grades on the screen method are used as toner density values of the lowest and the highest grades on the error diffusion method, and the gradation correction table for the latter method is updated on the basis of these toner density values.

As mentioned above, according to Embodiment 1, the print engine 11 performs development of toner patterns for gradation adjustment with omitting at least one patch image for any of halftoning methods according to the aforementioned Rule 1 and/or Rule 2.

Therefore, measurement time of toner density is reduced because the full length of the toner patterns for gradation adjustment decreases. Accordingly, the time taken for gradation adjustment is reduced.

Embodiment 2

An image forming apparatus in Embodiment 2 according to this invention uses a patch image that is an image generated by repeatedly arranging a partial image of a base pattern image. This base pattern image is generated from a plain patch image with a predetermined density by threshold-conversion (e.g. single-threshold conversion) of halftoning.

A basic configuration and behavior of the image forming apparatus in Embodiment 2 are identical to those in Embodiment 1 and therefore, they are not explained here. In the following part, generation of the patch image in Embodiment 2 is mentioned.

Figure 5:
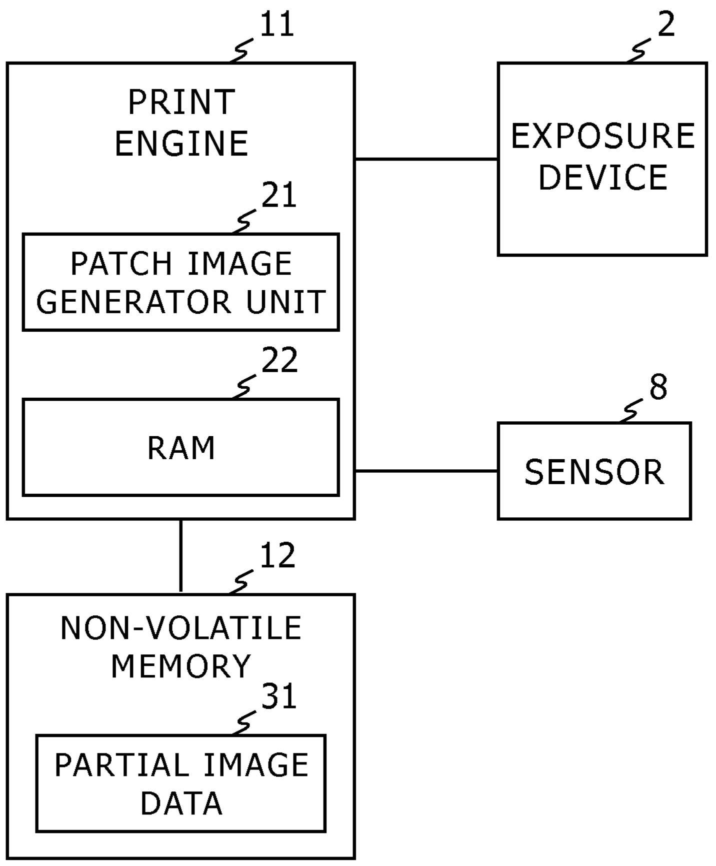
FIG. 5 is a block diagram that shows an electronic configuration of an image forming apparatus in Embodiment 2 according to this invention.

FIG. 5 is a block diagram that shows an electronic configuration of an image forming apparatus in Embodiment 2 according to this invention.

In Embodiment 2, in the non-volatile memory 12, partial image data 31 has been stored as shown in FIG. 5. The partial image data 31 is threshold-converted data of a partial image. The partial image is a part of a base pattern image with a predetermined size and does not contain any sides of the base pattern image. In Embodiment 2, the partial image data 31 is single-threshold converted data (i.e. binary image data) of such partial image.

The partial image data 31 contains threshold-converted data of partial images corresponding to grades in a gradation for plural halftoning methods (e.g. the screen method and the error diffusion method).

Figure 6A:
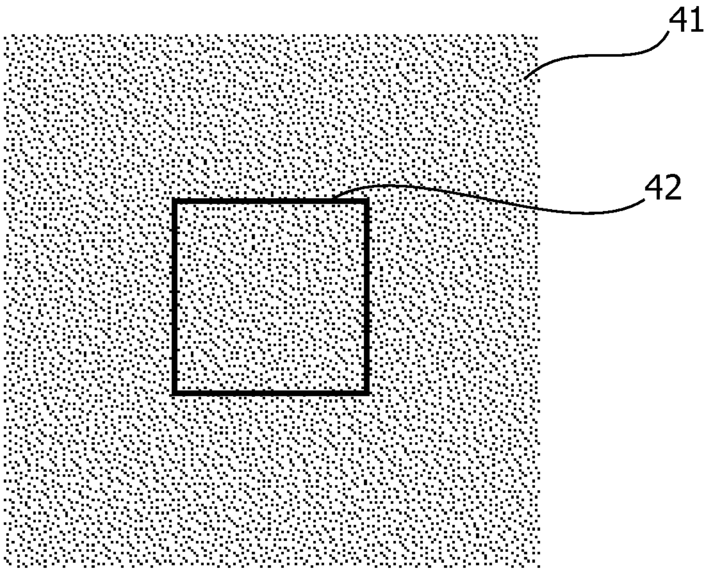
FIGS. 6A and 6B are diagrams that explain an instance of a patch image generated in Embodiment 2 according to this invention.
Figure 6B:
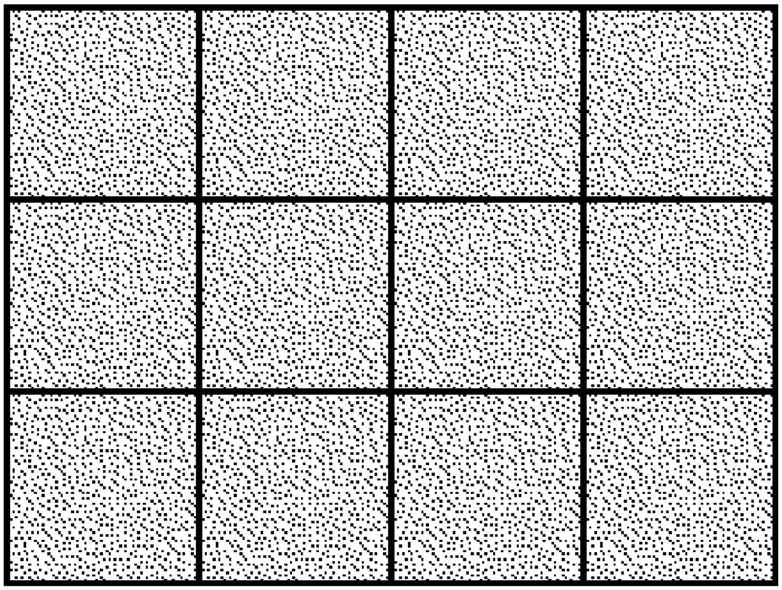

FIGS. 6A and 6B are diagrams that explain an instance of a patch data generated in Embodiment 2 according to this invention. FIG. 6A is a diagram that shows an instance of a partial image 42 of a base pattern image 41 generated from a plain patch image with a predetermined density by single-threshold conversion of a certain halftoning method. The partial image 42 in FIG. 6A is a partial image regarding the error diffusion method.

A coverage rate of the base pattern image 41 is proportional to the density of the original plain patch image. FIG. 6B is a diagram that shows an instance of a toner pattern formed by arranging the partial image 42. Thus, the partial image data 31 contains image data of partial images like the partial image 42 generated for respective grades in a gradation.

As shown in FIG. 6A, the partial image 42 is a center part (N×N dots) in the base pattern image 41 of M×M dots (M>N). The number of dots M in a side of the base pattern image 41 is, for example, about 120 to 200 and the number of dots N in a side of the partial image 42 is equal to or more than the square root of the number of the grades. For instance, N is equal to or more than 16, if there are 256 grades in a gradation.

It should be noted that in this embodiment, this partial image is smaller than a beam spot formed on the intermediate transfer belt 4 by the detection light emitted from the sensor 8. Thus, if the partial image has a rectangle shape (or a square shape), then the length of its diagonal line is shorter than the diameter of the spot (about 2 millimeter). Moreover, in this embodiment, the partial image has an area capable of depicting all of the grades (e.g. 256 grades).

In the print engine 11, a patch image generator unit 21 controls the exposure device 2 and so on to develop a patch image as shown in FIG. 6B. This patch image is generated by arranging the partial image 42 of the partial image data 31 repeatedly in the primary scan direction and the secondary scan direction.

Specifically, the patch image generator unit 21 stores the partial image data 31 in a RAM 22, reads parts of the partial image data 31 from the RAM 22 repeatedly for generating the toner pattern image, forms an electrostatic latent image of the toner pattern image on the photoconductor drums 1*a* to 1*d*, and performs toner development of the image. For instance, when depicting a line in the primary scan direction in the toner pattern image, the patch image generator unit 21 reads line data corresponding to the line in the partial image data 31 repeatedly. Therefore, the RAM 22 does not keep data of the whole toner pattern image at the same time.

As mentioned above, according to Embodiment 2, the print engine 11 generates the patch image by arranging the partial image of the partial image data 31 repeatedly, and performs development by using the generated patch image.

Therefore, data of such pattern image for gradation adjustment can be stored in a small memory area in a ROM or a RAM. In addition, since the partial image does not contain any sides of the base pattern image, the toner density adjustment error due to using the partial image tends to be small.

The description of the present invention has been presented for purposes of illustration and description, and is not intended to be exhaustive or limited to the invention in the form disclosed. Many modifications and variations will be apparent to those of ordinary skill in the art.

For instance, in the aforementioned embodiments, a single-threshold conversion is performed of halftoning method. Alternatively, this invention can be applied to other threshold conversion process e.g. converting to a quaternary image and so on. In such cases, unless a value of a pixel is not equal to zero, the pixel is counted as a pixel with a dot, and if the difference between the values of two adjacent pixels exceeds the predetermined value, a dot-level edge is counted.

What is claimed is:

1. An image forming apparatus, comprising:

an image carrier that holds a toner pattern;

a memory device in which toner pattern data has been stored;

a sensor that puts detection light onto the image carrier and detects reflection light from the image carrier; and a controller that performs development of toner patterns based on the toner pattern data corresponding to a first halftoning method and a second halftoning method, and identifies respective toner density values of patch images contained in each of the toner patterns from output of the sensor, the patch images corresponding to grades in a gradation respectively;

wherein one of the toner patterns contains first patch images for the first halftoning method, and another of the toner patterns contains second patch images for the second halftoning; and the controller performs development of only one out of both a first patch image which is one of the first patch images and a second patch image which is one of the second patch images and identifies toner density values of both the first patch image and the second patch image from output of the sensor for the only one out of both the first patch image and the second patch image if an absolute value of a difference between the number of dots in the first patch image and the number of dots in the second patch image is equal to or less than a predetermined value and an absolute value of a difference between the number of dot-level edges in the first patch image and the number of dot-level edges in the second patch image is equal to or less than a predetermined value.

2. The image forming apparatus according to claim 1, wherein:

the controller performs development of only one out of both the first patch image and the second patch image and identifies toner density values of both the first patch image and the second patch image from output of the sensor for the only one out of both the first patch image and the second patch image if the difference between the number of dots in the first patch image and the number of dots in the second patch image is equal to zero and an absolute value of a difference between the number of dot-level edges in the first patch image and the number of dot-level edges in the second patch image is equal to or less than a predetermined value.

3. The image forming apparatus according to claim 1, wherein:

the controller performs development of only one out of both the first patch image and the second patch image and identifies toner density values of both the first patch image and the second patch image from output of the sensor for the only one out of both the first patch image and the second patch image if the difference between the number of dots in the first patch image and the number of dots in the second patch image is equal to zero and the difference between the number of dot-level edges in the first patch image and the number of dot-level edges in the second patch image is equal to zero.

4. The image forming apparatus according to claim 1, wherein:

the toner pattern data is threshold-converted data of the toner patterns that have the first patch images and the second patch images except either the first patch image not developed or the second patch image not developed, and the controller performs development of the toner patterns based on the toner pattern data.

5. The image forming apparatus according to claim 1, wherein:

the toner pattern data is threshold-converted data of a partial image, the partial image is a part of a base pattern image with a predetermined size and does not include any side parts of the base pattern image, and the controller generates a patch image by arranging the partial image repeatedly, and performs the development by using the generated patch image.

6. The image forming apparatus according to claim 1, wherein:

the first halftoning method is a screen method, and the second halftoning method is an error diffusion method.

7. The image forming apparatus according to claim 1, further comprising:

a photoconductor; and a development device that develops the toner patterns on the photoconductor;

wherein the image carrier is an intermediate transfer member onto which the toner patterns are transferred from the photoconductor, and the controller performs development of the toner patterns on the photoconductor by controlling the development device.

8. An image forming apparatus, comprising:

an image carrier that holds a toner pattern;

a memory device in which toner pattern data has been stored;

a sensor that puts detection light onto the image carrier and detects reflection light from the image carrier; and a controller that performs development of toner patterns based on the toner pattern data corresponding to a first halftoning method and a second halftoning method, and identifies respective toner density values of patch images contained in each of the toner patterns from output of the sensor, the patch images corresponding to grades in a gradation respectively;

wherein one of the toner patterns contains first patch images for the first halftoning method, another of the toner patterns contains second patch images for the second halftoning, a first patch image which is one of the first patch images corresponds to a grade equal to or higher than a predetermined grade in the gradation, and a second patch image which is one of the second patch images corresponds to a grade equal to or higher than a predetermined grade in the gradation; and the controller performs development of only one out of both the first patch image and the second patch image and identifies toner density values of both the first patch image and the second patch image from output of the sensor for said only one out of both the first patch image and the second patch image if an absolute value of a difference between the number of dots in the first patch image and the number of dots in the second patch image is equal to or less than a predetermined value; wherein the toner pattern data is threshold-converted data of a partial image, the partial image is a part of a base pattern image with a predetermined size and does not include any side parts of the base pattern image, and the controller generates a patch image by arranging the partial image repeatedly, and performs development by using the generated patch image.

9. The image forming apparatus according to claim 8, wherein:

the toner pattern data is threshold-converted data of the toner patterns that have the first patch images and the second patch images except either the first patch image not developed or the second patch image not developed, and the controller performs development of the toner patterns based on the toner pattern data.

10. The image forming apparatus according to claim 8, wherein:

the first halftoning method is a screen method, and the second halftoning method is an error diffusion method.

11. The image forming apparatus according to claim 8, further comprising:

a photoconductor; and a development device that develops the toner patterns on the photoconductor;

wherein the image carrier is an intermediate transfer member onto which the toner patterns are transferred from the photoconductor, and the controller performs development of the toner patterns on the photoconductor by controlling the development device.

12. The image forming apparatus according to claim 8, further comprising:

a photoconductor; and a development device that develops the toner patterns on the photoconductor;

wherein the image carrier is an intermediate transfer member onto which the toner patterns are transferred from the photoconductor, and the controller performs development of the toner patterns on the photoconductor by controlling the development device.

13. An image forming apparatus, comprising:

an image carrier that holds a toner pattern;

a memory device in which toner pattern data has been stored;

a sensor that puts detection light onto the image carrier and detects reflection light from the image carrier; and a controller that performs development of toner patterns based on the toner pattern data corresponding to a first halftoning method and a second halftoning method, and identifies respective toner density values of patch images contained in each of the toner patterns from output of the sensor, the patch images corresponding to grades in a gradation respectively;

wherein one of the toner patterns contains first patch images for the first halftoning method, another of the toner patterns contains second patch images for the second halftoning, a first patch image which is one of the first patch images corresponds to a grade equal to or higher than a predetermined grade in the gradation, and a second patch image which is one of the second patch images corresponds to a grade equal to or higher than a predetermined grade in the gradation; and the controller performs development of only one out of both the first patch image and the second patch image and identifies toner density values of both the first patch image and the second patch image from output of the sensor for said only one out of both the first patch image and the second patch image if the difference between the number of dots in the first patch image and the number of dots in the second patch image is equal to zero.

14. The image forming apparatus according to claim 13, wherein:

the toner pattern data is threshold-converted data of the toner patterns that have the first patch images and the second patch images except either the first patch image not developed or the second patch image not developed, and the controller performs development of the toner patterns based on the toner pattern data.

15. The image forming apparatus according to claim 13, wherein:

the first halftoning method is a screen method, and the second halftoning method is an error diffusion method.

* * * * *